US009413277B2

(12) United States Patent
Sato et al.

(10) Patent No.: US 9,413,277 B2
(45) Date of Patent: Aug. 9, 2016

(54) ACTUATOR CONTROL DEVICE

(71) Applicant: DAIKIN INDUSTRIES, LTD., Osaka-shi, Osaka (JP)

(72) Inventors: Toshiaki Sato, Kusatsu (JP); Satoshi Yagi, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 78 days.

(21) Appl. No.: 14/368,492

(22) PCT Filed: Dec. 26, 2012

(86) PCT No.: PCT/JP2012/083567
§ 371 (c)(1),
(2) Date: Jun. 24, 2014

(87) PCT Pub. No.: WO2013/099900
PCT Pub. Date: Jul. 4, 2013

(65) Prior Publication Data
US 2014/0354198 A1    Dec. 4, 2014

(30) Foreign Application Priority Data

Dec. 28, 2011    (JP) .................. 2011-288954

(51) Int. Cl.
*H02P 6/00* (2016.01)
*H02P 6/08* (2016.01)
*H02P 6/06* (2006.01)

(52) U.S. Cl.
CPC .. *H02P 6/08* (2013.01); *H02P 6/06* (2013.01); *H02P 23/22* (2016.02)

(58) Field of Classification Search
USPC ............... 318/568.17, 568.2, 571, 671, 156, 318/400.16
See application file for complete search history.

(56) References Cited

U.S. PATENT DOCUMENTS

| 6,089,355 | A | 7/2000 | Seki et al. |
| 2005/0057205 | A1 | 3/2005 | Rehm et al. |
| 2009/0080115 | A1 | 3/2009 | Kokami et al. |
| 2010/0177444 | A1 | 7/2010 | Kokami et al. |

FOREIGN PATENT DOCUMENTS

| CN | 1221701 A | 7/1999 |
| EP | 0 903 313 A2 | 3/1999 |
| JP | 58-99279 A | 6/1983 |
| JP | 2009-77524 A | 4/2009 |
| JP | 2009077524 A * | 4/2009 |

OTHER PUBLICATIONS

International Preliminary Report of corresponding PCT Application No. PCT/JP2012/083567 dated Jul. 10, 2014.
International Search Report of corresponding PCT Application No. PCT/JP2012/083567 dated Apr. 9, 2013.
European Search Report of corresponding EP Application No. 12 86 1257.9 dated Apr. 25, 2016.

* cited by examiner

*Primary Examiner* — Eduardo Colon Santana
*Assistant Examiner* — Iftekhar Mustafa
(74) *Attorney, Agent, or Firm* — Global IP Counselors

(57) ABSTRACT

An actuator control device includes an upper-level control unit that sets an upper-level target value of a predetermined control factor relating to driving an actuator, a lower level control unit, and an intermediate control unit. The lower-level control unit has a command input element that receives an input of the upper-level target value and outputs a lower-level target value of the predetermined control factor, an actuator control element that receives an input of the lower-level target value and controls the actuator, and a tracking element that causes an actual value of the predetermined control factor in the actuator to track the lower-level target value. The intermediate control unit causes the actual value of the predetermined control factor in the actuator to track the upper-level target value. The upper-level target value is inputted into the command input element of the lower-level control unit via the intermediate control unit.

10 Claims, 4 Drawing Sheets

ACTUATOR CONTROL DEVICE

CROSS-REFERENCE TO RELATED APPLICATIONS

This U.S. National stage application claims priority under 35 U.S.C. §119(a) to Japanese Patent Application No. 2011-288954, filed in Japan on Dec. 28, 2011, the entire contents of which are hereby incorporated herein by reference.

TECHNICAL HELD

The present invention relates to an actuator control device, and particularly to an actuator control device suitable for controlling of a motor.

BACKGROUND ART

When an actuator such as a motor is controlled using an IC in which there is a large amount of variation in the command input circuit into which a command from, e.g., a microcomputer is inputted, instances occur in which the output of the actuator does not follow the command as required by the microcomputer.

There is known, as a technique for solving this problem, e.g., in relation to a motor, a speed control device disclosed in the prior art in JP-A 58-99279. In this speed control device, a current minor control loop comprising a current detector and a current adjuster is provided to a speed adjustment loop comprising a speed detector and a speed adjuster, and the actual speed of the motor is controlled so as to reach the target speed.

This Patent Literature also proposes an inexpensive speed control device in which the current value is estimated, whereby the current detector and the current adjuster are removed from the current minor control loop according to the prior art.

SUMMARY

Technical Problem

However, the former presents an inconvenience in that, as pointed out in Patent Literature 1, the current detector and the current adjuster must be selected according to the current capacity of the motor. In the latter, in the current minor control loop, the estimated value of the current value is fed back. Therefore, an error with respect to the measured value is included, and it cannot be said that the motor output tracks the command input from an upper-level control unit in an accurate manner.

The present invention addresses the problem of providing an actuator control device for causing the output of an actuator to track the command input from an upper-level control unit in an accurate manner, even when the actuator is controlled using an IC in which there is a large amount of variation in the command.

Solution to Problem

An actuator control device according to a first aspect of the present invention comprises an upper-level control unit, a lower-level control unit, and an intermediate control unit. The upper-level control unit sets an upper-level target value of a predetermined control factor relating to driving an actuator. The lower-level control unit has a command input element, an actuator control element, and a tracking element. The command input element receives an input of the upper-level target value via the intermediate control unit, and outputs a lower-level target value of the predetermined control factor having a different value from the upper-level target value. The actuator control element receives an input of the lower-level target value and controls the actuator. The tracking element causes the actual value of the predetermined control factor in the actuator to track the lower-level target value. The intermediate control unit causes the actual value of the predetermined control factor in the actuator to track the upper-level target value. The upper-level target value is inputted into the command input element of the lower-level control unit via the intermediate control unit.

In this actuator control device, the difference between the actual value and the target value of the predetermined control factor of the actuator required by the upper-level control unit is reduced.

An actuator control device according to a second aspect of the present invention is the actuator control device according to the first aspect, wherein the intermediate control unit increases or decreases the upper-level target value inputted into the command input element in order to match the actual value of the predetermined control factor with the upper-level target value.

In this actuator control device, the difference between the actual value and the target value of the predetermined control factor of the actuator required by the upper-level control unit is further reduced.

An actuator control device according to a third aspect of the present invention is the actuator control device according to the first or second aspects, wherein the value inputted into the tracking element and the value inputted into the intermediate control unit are the same factor. In addition, each of the tracking element and the intermediate control unit constitutes a closed loop for feeding back the actual value of the predetermined control factor.

In this actuator control device, since it is only necessary to monitor the same control factor, it is possible to reduce component cost and printed substrate size by, e.g., shared use of the detection circuit or other elements.

An actuator control device according to a fourth aspect of the present invention is the actuator control device according to one of the first through third aspects, wherein the speed at which the intermediate control unit causes the actual value of the predetermined control factor to track the upper-level target value is lower than the speed at which the tracking element causes the actual value of the predetermined control factor to track the lower-level target value.

In this actuator control device, the configuration is such that tracking of the upper-level target value is performed after the result of the previous control takes effect, therefore making it possible to prevent hunting (a phenomenon in which the rotation speed fluctuates up and down, causing a vibration) caused by the control for tracking the upper-level target value and the control for tracking the lower-level target value being performed simultaneously.

An actuator control device according to a fifth aspect of the present invention is the actuator control device according to one of the first through fourth aspects, wherein the command input element, the actuator control element, and the tracking element in the lower-level control unit are modularized in a single package.

In this actuator control device, the command input element, the actuator control element, and the tracking element are modularized in a single package, thereby making it possible to reduce the size and the cost of the lower-level control unit.

An actuator control device according to a sixth aspect of the present invention is the actuator control device according to one of the first through fifth aspects, wherein the intermediate control unit is included in the upper-level control unit.

In this actuator control device, in an example in which, e.g., the upper-level control unit, the lower-level control unit, and the intermediate control unit are mounted on a single printed substrate, a configuration in which the intermediate control unit is included in the upper-level control unit results in a decrease in the area occupied by the all of the mounted items on the printed substrate despite a moderate increase in the size of the upper-level control unit, making it possible to reduce the size of the printed substrate.

An actuator control device according to a seventh aspect of the present invention is the actuator control device according to one of the first through sixth aspects, wherein the actuator is a motor, and the predetermined control factor is the rotation speed of the motor.

In this actuator control device, in order to match the actual rotation speed of the motor with the upper-level target value, prior to the upper-level target value being inputted into the command input element, the intermediate control unit increases or decreases the upper-level target value, therefore reducing the difference between the actual rotation speed and the rotation speed of the motor requested by the upper-level control unit.

Effect of the Invention

In the actuator control device according to the first or second aspects of the present invention, the difference between the actual value and the target value of the predetermined control factor for the actuator requested by the upper-level control unit is reduced.

In the actuator control device according to the third aspect of the present invention, since it is only necessary to monitor the same control factor, it is possible to reduce component cost and printed substrate size by, e.g., shared use of the detection circuit or other elements.

In the actuator control device according to the fourth aspect of the present invention, the configuration is such that tracking of the upper-level target value is performed after the result of the previous control takes effect, therefore making it possible to prevent hunting.

In the actuator control device according to the fifth aspect, the command input element, the actuator control element, and the tracking element are modularized in a single package, thereby making it possible to reduce the size and the cost of the lower-level control unit.

In the actuator control device according to the sixth aspect, in an example in which, e.g., the upper-level control unit, the lower-level control unit, and the intermediate control unit are mounted on a single printed substrate, the area occupied by the all of the mounted items on the printed substrate decreases, making it possible to reduce the size of the printed substrate.

In the actuator control device according to the seventh aspect, in order to match the actual rotation speed of the motor with the upper-level target value, prior to the upper-level target value being inputted into the command input element, the intermediate control unit increases or decreases the upper-level target value, therefore reducing the difference between the actual rotation speed and the rotation speed of the motor requested by the upper-level control unit.

DESCRIPTION OF EMBODIMENT

An embodiment of the present invention will now be described with reference to the accompanying drawings. The following embodiment is a specific example of the present invention and is not intended to limit the technical scope of the present invention.

(1) OVERVIEW

Figure 1:
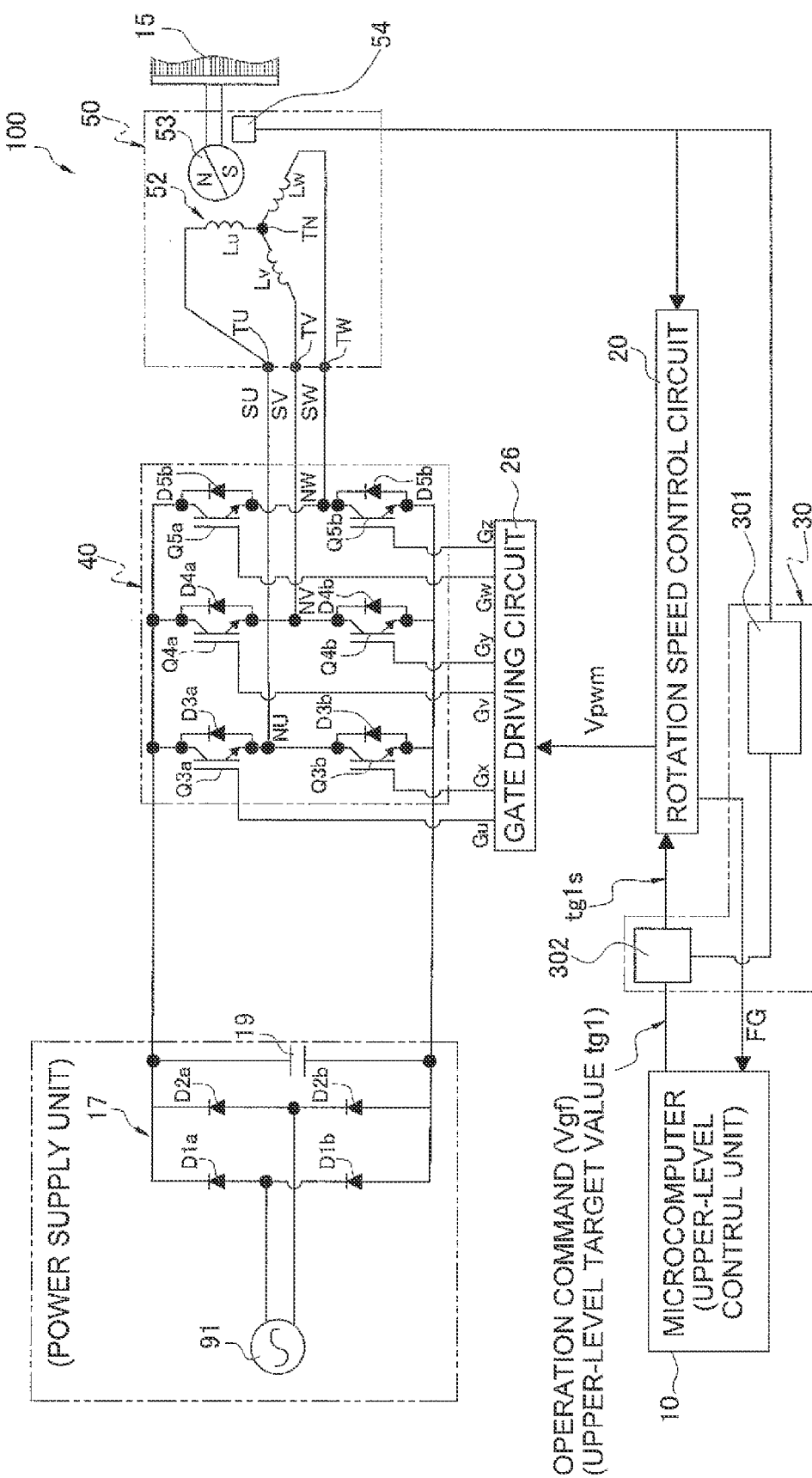
FIG. 1 is a circuit diagram of a motor control device according to an embodiment of the present invention.

FIG. 1 is a circuit diagram of a motor control device 100 according to an embodiment of the present invention. In FIG. 1, the motor control device 100 is an actuator control device for controlling the rotation of a brushless DC motor 50 using an inverter 40. The brushless DC motor 50 is used to drive an indoor fan 15 installed in an indoor unit of a heat-pump-type air conditioner.

The brushless DC motor 50 is a three-phase brushless DC motor, and comprises a stator 52, a rotor 53, and a rotor position detection sensor 54. The stator 52 includes star-connected U-phase, V-phase, and W-phase driving coils Lu, Lv, and Lw. The ends of the driving coils Lu, Lv, and Lw are respectively connected to respective driving coil terminals TU, TV, and TW of U-phase, V-phase, and W-phase wires extending from the inverter 40. The other ends of the driving coils Lu, Lv, and Lw are connected to each other as a terminal TN. The rotation of the rotor 53 causes the three-phase driving coils Lu, Lv, and Lw to generate an induced voltage corresponding to the rotation speed and the position of the rotor 53.

The rotor 53 includes a permanent magnet having a plurality of poles comprising an N-pole and an S-pole, and rotates about a rotary axis with respect to the stator 52. The rotation of the rotor 53 is outputted, through an output shaft (not shown) disposed coaxially with respect to the rotation axis, to the indoor fan 15.

The rotor position detection sensor 54 detects the rotation position of the rotor 53. A Hall element is incorporated in the stator 52, and the rotor position detection sensor 54 reacts to the Hall element and outputs a detection signal.

(2) CONFIGURATION OF MOTOR CONTROL DEVICE 100

As shown in FIG. 1, the motor control device 100 comprises: a power supply unit configured as a DC power source from a commercial power source 91, a rectification unit 17, and a smoothing capacitor 19; a microcomputer 10 and a rotation speed control circuit 20, a gate driving circuit 26, an intermediate control unit 30, and an inverter 40. These elements are mounted, e.g., on a single printed substrate.

(2-1) Rectification Unit 17

The rectification unit 17 is configured as a bridge form by four diodes D1$a$, D1$b$, D2$a$, D2$b$. Specifically, the diodes D1$a$ and D1$b$, and diodes D2$a$ and D2$b$, are respectively connected in series to each other. The cathode terminals of the diodes D1$a$, D2$a$ are both connected to a plus-side terminal of the smoothing capacitor 19, and function as a positive-side output terminal of the rectification unit 17. The anode terminals of the diodes D1b, D2b are both connected to the minus-side terminal of the smoothing capacitor 19, and function as a negative-side output terminal of the rectification unit 17.

The connection point between the diodes D1a and D1b is connected to one of the poles of the commercial power source 91. The connection point between the diodes D2a and D2b is connected to the other pole of the commercial power source 91. The rectification unit 17 rectifies the AC current outputted from the commercial power source 91, generates a DC power supply, and supplies the DC power to the smoothing capacitor 19.

(2-2) Smoothing Capacitor 19

One end of the smoothing capacitor 19 is connected to the positive-side output terminal of the rectification unit 17, and the other end of the smoothing capacitor 19 is connected to the negative-side output terminal of the rectification unit 17. The smoothing capacitor 19 smoothes the voltage rectified by the rectification unit 17.

The voltage after smoothing by the smoothing capacitor 19 (post-smoothing voltage) is applied to the inverter 40 connected to the output side of the smoothing capacitor 19. In other words, the commercial power source 91, the rectification unit 17, and the smoothing capacitor 19 constitute a power supply unit for supplying power to the inverter 40.

Examples of the type of capacitor include an electrolytic capacitor, ceramic capacitor, and/or tantalum capacitor. However, in the present embodiment, an electrolytic capacitor is employed as the smoothing capacitor 19.

(2-3) Inverter 40

The inverter 40 is connected to the output side of the smoothing capacitor 19. In FIG. 1, the inverter 40 includes a plurality of insulated-gate bipolar transistors (IGBTs; hereafter referred to simply as transistors) Q3a, Q3b, Q4a, Q4b, Q5a, Q5b and a plurality of reflow diodes D3a, D3b, D4a, D4b, D5a, D5b.

The transistors Q3a and Q3b, transistors Q4a and Q4b, and transistors Q5a and Q5b are respectively connected in series to each other. Each of the diodes D3a to D5b is connected in parallel to a transistor Q3a to Q5b so that a collector terminal of the transistor and a cathode terminal of the diode are connected, and an emitter terminal of the transistor and an anode terminal of the diode are connected.

The post-smoothing voltage from the smoothing capacitor 19 being applied, and the transistors Q3a to Q5b being switched ON/OFF at a timing indicated by the gate driving circuit 26, cause the inverter 40 to generate driving voltages SU, SV, and SW for driving the brushless DC motor 50. The driving voltages SU, SV and SW are outputted from each of the connection points NU, NV, NW between the transistors Q3a and Q3b, Q4a and Q4b, and Q5a and Q5b to the blushless DC motor 50, respectively.

(2-4) Gate Driving Circuit 26

The gate driving circuit 26 changes the ON/OFF state of the transistors Q3a to Q5b of the inverter 40 on the basis of a command Vpwm from the rotation speed control circuit 20. Specifically, the gate driving circuit 26 generates gate control voltages Gu, Gx, Gv, Gy, Gw, and Gz applied on the gates of the transistors Q3a to Q5b so that pulse-shaped driving voltages SU, SV, and SW having a duty determined by the rotation speed control circuit 20 are outputted from the inverter 40 to the brushless DC motor 50. The generated gate control voltages Gu, Gx, Gv, Gy, Gw, and Gz are applied to the respective gate terminals of the transistors Q3a to Q5b.

The inverter 40 in the present embodiment is a voltage-type inverter, but this is not provided by way of limitation. A matrix converter or a current-type inverter can also be used.

(2-5) Microcomputer 10

The microcomputer 10 is connected to the rotation speed control circuit 20. The microcomputer 10 is also connected to a system control unit (not shown) for performing overall control on the heat-pump-type air conditioner, and adapted to control the driving of the brushless DC motor 50 according to the presence or absence of an abnormality in each device. Thus, the microcomputer 10 functions as an upper-level control unit. A power supply separate from the inverter 40 is constantly supplied to the microcomputer 10 irrespective of the driving state of the brushless DC motor 50.

Figure 2:
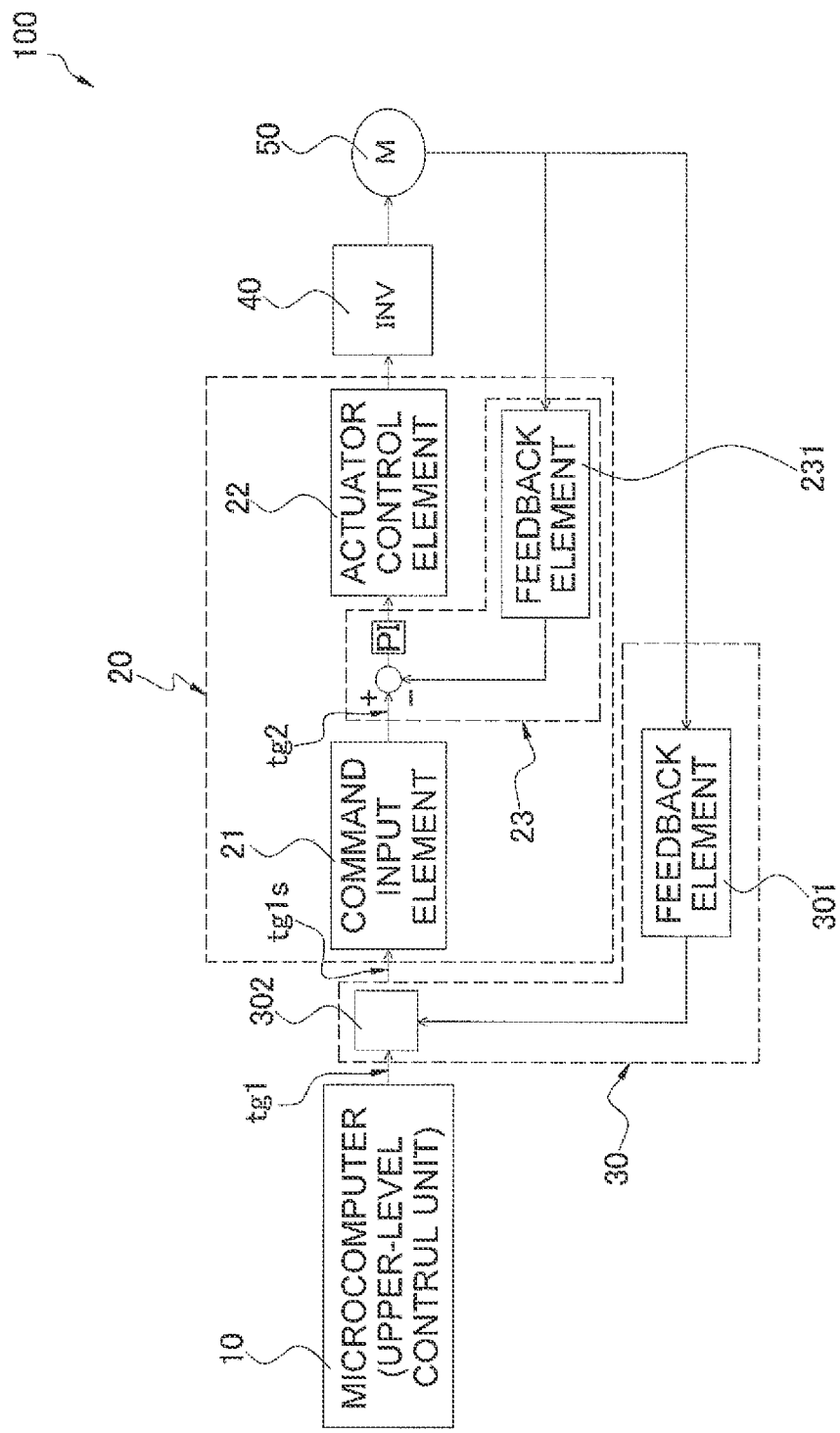
FIG. 2 is a control block diagram of the motor control device.

FIG. 2 is a control block diagram of the motor control device 100. In FIG. 2, the microcomputer 10, which is an upper-level control unit, sets an upper-level target value tg1, and inputs the upper-level target value tg1 through the intermediate control unit 30 (described further below) into the rotation speed control circuit 20, which is a tower-level control unit. The upper-level target value tg1 is a target rotation speed for the brushless DC motor 50.

(2-6) Rotation Speed Control Circuit 20

The rotation speed control circuit 20, which is the lower-level control unit, is connected to the microcomputer 10 and the gate driving circuit 26. The rotation speed control circuit 20 is a circuit for driving the brushless DC motor 50 on the basis of an operation command Vfg including a rotation speed command received from the microcomputer 10 via the intermediate control unit 30.

The rotation speed control circuit 20, which is the lower-level control unit, includes a command input element 21, an actuator control element 22, and a tracking element 23. The command input element 21 receives an input of the upper-level target value tg1 via an adjustment unit 302 of the intermediate control unit 30 described further below. In order to match the actual value being controlled with the upper-level target value tg1, prior to the upper-level target value tg1 being inputted into the command input element 21, the adjustment unit 302 of the intermediate control unit 30 creates a pseudo upper-level target value tg1s obtained by increasing or decreasing the upper-level target value tg1, and inputs the pseudo upper-level target value tg1s into the command input element 21. The command input element 21 performs a process on the pseudo upper-level target value tg1s for adapting the pseudo upper-level target value tg1s for internal computation. In such an instance, due to a variation in the processing circuit, a value different from the pseudo upper-level target value tg1s is outputted. This value will be referred to as a lower-level target value tg2.

For example, even if the command input element 21 sets, at the input-side, the target rotation speed of the brushless DC motor 50 to 1000 rpm, the variation in the processing circuit results in 950 rpm being outputted. In other words, the upper-level target value tg1 is 1000 rpm, and the lower-level target value tg2 is 950 rpm. The lower-level target value tg2 is subjected to a subtraction process with respect to the actual rotation speed received from the tracking element 23, and then inputted into the actuator control element 22.

Possible variations in the processing circuit include those caused by a variation in properties of components constituting the command input element, a variation in the input value detection cycle, and/or a variation in the oscillation circuit for determining the control cycle for the rotation speed control circuit.

The actuator control element 22 is a control unit tier controlling the rotation speed of the brushless DC motor 50. When the result of the subtraction process is inputted, the actuator control element 22 performs PI control on the rotation speed, and determines the voltage to be applied on the brushless DC motor 50. Generally, the rotation speed of the brushless DC motor 50 is controlled by changing the ON/OFF states of each of the transistors in the inverter 40. The actuator control element 22 inputs a command voltage Vpwm including the duties of the driving voltages SU, SV, and SW into the gate driving circuit 26 and thereby controls the gate driving circuit 26, and causes the gate driving circuit 26 to generate gate control voltages to be applied to the gates of the transistors so that the pulse-shaped driving voltages are outputted from the inverter 40 to the brushless DC motor 50.

The tracking element 23 causes the actual rotation speed of the brushless DC motor 50 to track the lower-level target value tg2. The tracking element 23 includes a rotation speed computation unit 231 as a feedback element. The rotation speed computation unit 231 computationally obtains the present rotation speed of the brushless DC motor 50 using the rotor position detected by the rotor position detection sensor 54.

The computation result is subjected to a subtraction process with respect to the lower-level target value tg2 and then inputted into the actuator control element 22. Thus, the tracking element 23 constitutes a closed loop for feeding back the actual rotation speed, and the rotation speed control circuit 20, which is the lower-level control unit, has a closed loop for feeding back the actual rotation speed of the brushless DC motor 50.

(2-7) Intermediate Control Unit 30

The intermediate control unit 30 causes the actual rotation speed of the brushless DC motor 50 to track the upper-level target value tg1. The intermediate control unit 30 includes a rotation speed computation unit 301 and an adjustment unit 302. The rotation speed computation unit 301 is a feedback element, and uses the rotor position detected by the rotor position detection sensor 54 to computationally obtain the present rotation speed of the brushless DC motor 50. In order to match the actual rotation speed of the brushless DC motor 50 with the upper-level target value tg1, the adjustment unit 302 increases or decreases the upper-level target value tg1 prior to the upper-level target value tg1 being inputted into the command input element 21. The post increase/decrease value, i.e., the pseudo upper-level target value tg1s, is inputted into the command input element 21. Thus, the intermediate control unit 30 constitutes a closed loop for feeding back the actual rotation speed of the brushless DC motor 50.

The speed at which the intermediate control unit 30 causes the actual rotation speed of the brushless DC motor 50 to track the upper-level target value tg1 is set so as to be lower than the speed at which the tracking element 23 causes the actual rotation speed of the brushless DC motor 50 to track the lower-level target value tg2. Setting, e.g., an approximately tenfold difference between the tracking speeds makes it possible for the intermediate control unit 30 to absorb the variation in the command input element 21 after the lower-level control unit 20 has converged.

As described above, in order to match the actual rotation speed of the brushless DC motor 50 with the upper-level target value tg1, prior to the upper-level target value tg1 being inputted into the command input element 21, the intermediate control unit 30 increases or decreases the upper-level target value tg1 and the variation in the command input element is absorbed. Therefore, the difference between the actual rotation speed and the rotation speed of the brushless DC motor 50 requested by the microcomputer 10 is reduced, and correct tracking of the upper-level target value tg1 becomes possible even when there is a variation in the command input element 21.

To describe this effect using specific values as an analogy, conventionally, even when the target rotation speed of the brushless DC motor 50 is set to 1000 rpm, the variation in the processing circuit in the command input element 21 causes 950 rpm, which is smaller than the original target value, is outputted. Therefore, the actuator control element 22 controls the rotation speed of the brushless DC motor 50 so as to converge to 950 rpm. However, in the present embodiment, in order to match the actual rotation speed of the brushless DC motor 50 with the target rotation speed of 1000 rpm, the intermediate control unit 30 sets, e.g., a target rotation speed tg1s to 1050 rpm so as to be greater than tg1, whereby the output tg2 of the command input element 21 becomes 1000 rpm. Therefore, the actuator control element 22 controls the rotation speed of the brushless DC motor 50 so as to converge to 1000 rpm, and the actual rotation speed coincides with the rotation speed of the brushless DC motor 50 requested by the microcomputer 10, which is the upper-level control unit. The fact that such a result can be obtained has been confirmed by experimentation performed by the applicant.

Figure 3:
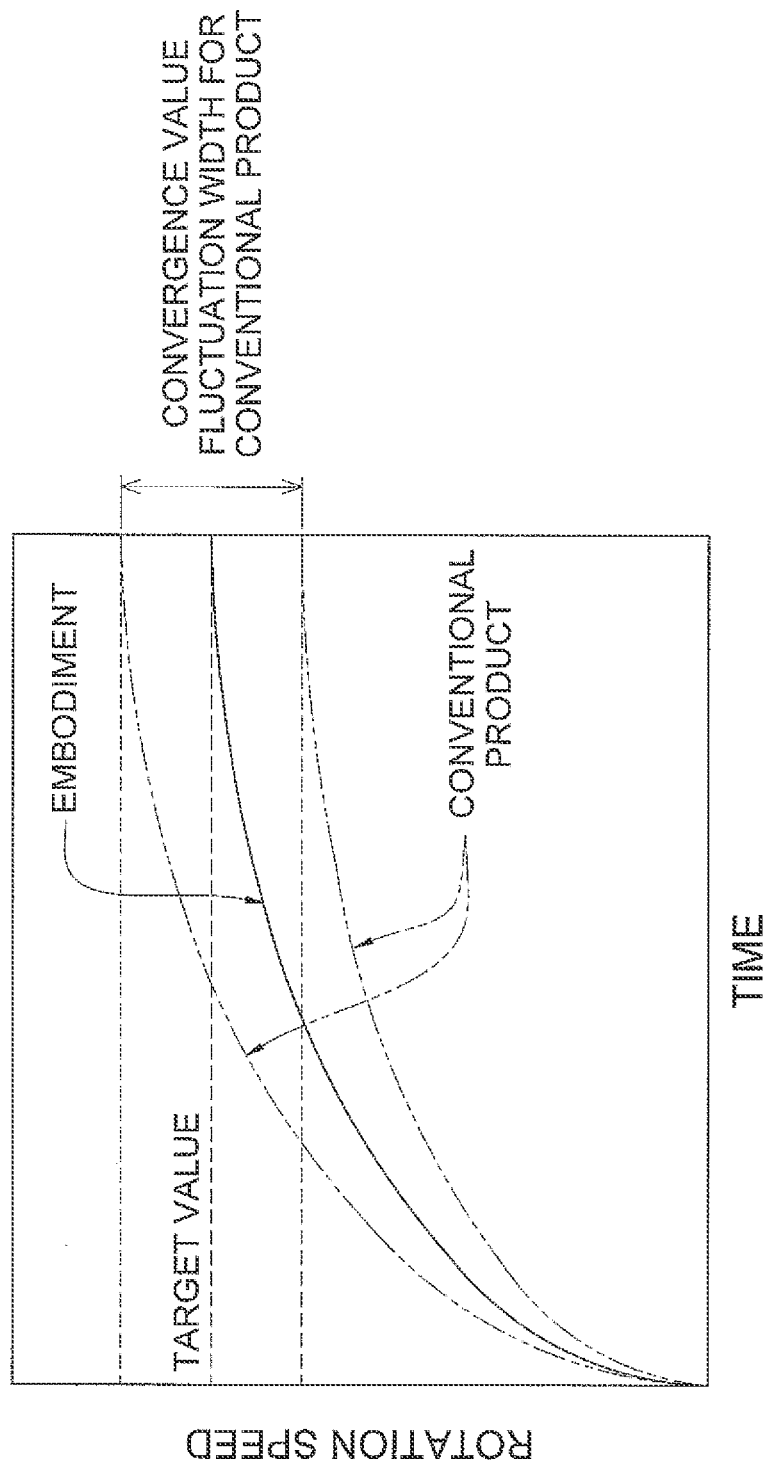
FIG. 3 is a graph showing the rotation speed response of a motor controlled by the motor control device.

FIG. 3 is a graph showing an example of the rotation speed response of a motor controlled by the motor control device 100. In FIG. 3, the horizontal axis represents time and the vertical axis represents the rotation speed. Each of the dotted curves represents the rotation speed response of a motor controlled by a conventional motor control device, and the solid curve represents the rotation speed response of a motor controlled by the motor control device of the present embodiment.

As shown in FIG. 3, the rotation speed of the motor controlled by the conventional motor control device converges, over time, so as to leave a given deviation, corresponding to the variation, from the target value. In contrast, the rotation speed of the motor controlled by the motor control device of the present embodiment approaches, over time, the target value.

(3) CHARACTERISTIC 3-1

In the motor control device 100, the microcomputer 10 sets the upper-level target rotation speed of the brushless DC motor 50. The command input element 21 of the rotation speed control circuit 20 receives an input from the upper-level target rotation speed via the intermediate control unit 30, and outputs the lower-level target rotation speed having a different value to the upper-level target rotation speed. The actuator control element 22 receives the input from the lower-level target rotation speed and controls the brushless DC motor 50 by PI control. The tracking element 23 causes the actual rotation speed of the brushless DC motor 50 to track the lower-level target rotation speed. The intermediate control unit 30 causes the actual rotation speed of the brushless DC motor 50 to track the upper-level target rotation speed. In such an instance, in order to match the actual rotation speed of the brushless DC motor 50 with the upper-level target rotation speed, prior to the upper-level target rotation speed being inputted into the command input element 21, the intermediate control unit 30 creates a pseudo upper-level target rotation speed obtained by increasing or decreasing the upper-level target rotation speed, and inputs the pseudo upper-level target rotation speed into the command input element 21. As a result, in the motor control device 100, the difference between the actual rotation speed and the target rotation speed of the brushless DC motor 50 requested by the microcomputer 10 is reduced.

3-2

In the motor control device 100, the speed at which the intermediate control unit 30 causes the actual rotation speed of the brushless DC motor 50 to track the upper-level target rotation speed is set so as to be lower than the speed at which the tracking element 23 causes the actual rotation speed of the brushless DC motor 50 to track the lower-level target rotation speed. In other words, the configuration is such that tracking of the upper-level target rotation speed is performed after the result of the previous control takes effect, therefore making it possible to prevent hunting (a phenomenon in which the rotation speed fluctuates up and down, causing a vibration).

3-3

In the motor control device 100, the rotation speed control circuit 20 has a closed loop for feeding back the actual rotation speed of the brushless DC motor 50. In addition, the intermediate control unit 30 constitutes a closed loop for feeding back the actual rotation speed of the brushless DC motor 50. The values inputted into the rotation speed control circuit 20 and the intermediate control unit 30 are the same factor, i.e., the actual rotation speed.

(4) MODIFICATION EXAMPLES (4-1) First Modification Example

In the above embodiment, each of the tracking element 23 and the intermediate control unit 30 includes a feedback element as disclosed in FIG. 2; however, this is not provided by way of limitation. A description will now be given with reference to FIG. 4.

Figure 4:
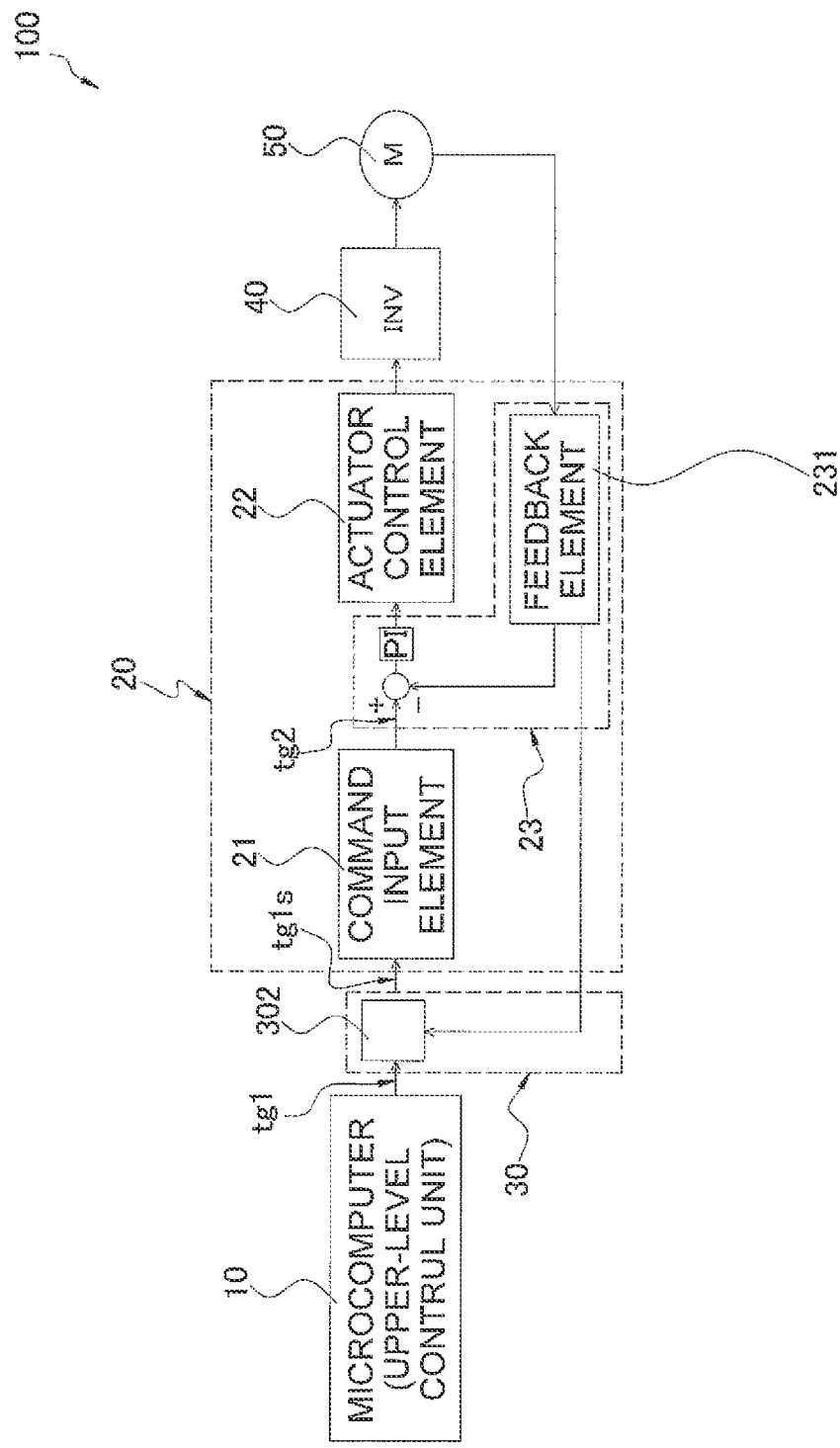
FIG. 4 is a control block diagram of a motor control device according to a first modification example.

FIG. 4 is a control block diagram of the motor control device 100 according to a first modification example. In FIG. 4, the tracking element 23 and the intermediate control unit 30 share the rotation speed computation unit 231, which is a feedback element. It is thereby possible to reduce the size and the cost of the motor control device 100.

The control factor in the intermediate control unit 30 is, as with the tracking element 23, the rotation speed of the brushless DC motor 50. However, the adjustment unit 302 may perform an adjustment to a value that can be subjected to a subtraction process with respect to the upper-level target value tg1. In such an instance, the control factor will be the same but the values will be different.

(4-2) Second Modification Example

The command input element 21, the actuator control element 22, and the tracking element 23 in the rotation speed control circuit 20 may be modularized in a single package. It is thereby possible to reduce the size and the cost of the rotation speed control circuit 20.

(4-3) Third Modification Example

The intermediate control unit 30 may be included in the microcomputer 10, which is the upper-level control unit. As a result, in an example in which, e.g., the microcomputer 10, the rotation speed control circuit 20, the gate driving circuit 26, the intermediate control unit 30, and the inverter 40 are mounted on a single printed substrate, the intermediate control unit 30 being included in the microcomputer 10 and the intermediate control unit 30 being realized as software results in a decrease in the area occupied by all mounted items on the printed substrate, making it possible to reduce the size of the printed substrate.

In an instance in which a modularized circuit is used as in the second modification example, scalability is also increased. For example, realizing the intermediate control unit 30 as software on the microcomputer 10 makes it possible to respond to a change in specifications of the modularized circuit by changing a control constant on the software.

INDUSTRIAL APPLICABILITY

As described above, the motor control device of the present invention makes it possible to cause the output of a brushless DC motor to track the command input from a microcomputer in an accurate manner, and is therefore useful not only for an indoor fan mounted on the indoor unit of a heat-pump-type air conditioner, but also for an outdoor fan mounted on the outdoor unit of an air conditioner or an outdoor fan mounted on a heat source unit of a heat-pump-type hot water supply device.

What is claimed is:

1. An actuator control device comprising:
    an upper-level control unit configured to set an upper-level target value of a predetermined control factor relating to driving an actuator;
    a lower-level control unit having
        a command input element configured to receive an input of the upper-level target value and to output a lower-level target value of the predetermined control factor having a different value from the upper-level target value,
        an actuator control element configured to receive an input of the lower-level target value and to control the actuator, and
        a tracking element configured to cause an actual value of the predetermined control factor in the actuator to track the lower-level target value; and
    an intermediate control unit configured to cause the actual value of the predetermined control factor in the actuator to track the upper-level target value,
    the upper-level target value being inputted into the command input element of the lower-level control unit via the intermediate control unit,
    the value inputted into the tracking element and a value inputted into the intermediate control unit being the same factor, and
    each of the tracking element and the intermediate control unit constituting a closed loop configured to feed back the actual value of the predetermined control factor.

2. The actuator control device according to claim 1, wherein
    the intermediate control unit is further configured to increase or decrease the upper-level target value inputted into the command input element in order to match the actual value of the predetermined control factor with the upper-level target value.

3. The actuator control device according to claim 1, wherein
a speed at which the intermediate control unit causes the actual value of the predetermined control factor to track the upper-level target value is lower than a speed at which the tracking element causes the actual value of the predetermined control factor to track the lower-level target value.

4. The actuator control device according to claim 1, wherein
the command input element, the actuator control element, and the tracking element in the lower-level control unit are modularized in a single package.

5. The actuator control device according to claim 1, wherein
the actuator is a motor, and
the predetermined control factor is a rotation speed of the motor.

6. The actuator control device according to claim 2, wherein
a speed at which the intermediate control unit causes the actual value of the predetermined control factor to track the upper-level target value is lower than a speed at which the tracking element causes the actual value of the predetermined control factor to track the lower-level target value.

7. The actuator control device according to claim 2, wherein
the command input element, the actuator control element, and the tracking element in the lower-level control unit are modularized in a single package.

8. The actuator control device according to claim 2, wherein
the actuator is a motor, and
the predetermined control factor is a rotation speed of the motor.

9. The actuator control device according to claim 3, wherein
the command input element, the actuator control element, and the tracking element in the lower-level control unit are modularized in a single package.

10. The actuator control device according to claim 3, wherein
the actuator is a motor, and
the predetermined control factor is a rotation speed of the motor.

\* \* \* \* \*